United States Patent [19]
Kitagawa et al.

[11] Patent Number: 5,748,995
[45] Date of Patent: May 5, 1998

[54] VIBRATION REDUCING APPARATUS AND VIBRATION REDUCING CAMERA

[75] Inventors: Yoshihisa Kitagawa, Kasukabe; Shinichi Hirano, Utsunomiya, both of Japan

[73] Assignee: Nikon Corporation, Tokyo, Japan

[21] Appl. No.: 713,251

[22] Filed: Sep. 12, 1996

[30] Foreign Application Priority Data

Sep. 14, 1995 [JP] Japan .................... 7-236823

[51] Int. Cl.$^6$ .................................. G03B 17/00
[52] U.S. Cl. ................... 396/55; 348/208; 359/557
[58] Field of Search ..................... 396/52, 53, 54, 396/55; 359/554, 555, 556, 557; 348/207, 208

[56] References Cited

U.S. PATENT DOCUMENTS

| | | | |
|---|---|---|---|
| 5,117,246 | 5/1992 | Takahashi et al. | 396/55 |
| 5,153,633 | 10/1992 | Otani | 396/55 |
| 5,181,056 | 1/1993 | Noguchi et al. | 396/55 |

FOREIGN PATENT DOCUMENTS

| | | |
|---|---|---|
| 3-235927 | 10/1991 | Japan . |
| 5-66452 | 3/1993 | Japan . |
| 6-118493 | 4/1994 | Japan . |

*Primary Examiner*—Safet Metjahic
*Assistant Examiner*—J. K. Ham

[57] ABSTRACT

A vibration reducing apparatus comprises a holding unit for holding a vibration reducing optical system, a vibration reducing drive unit for reducing vibrations of an object image by moving the holding unit, a lock unit for locking the holding unit in a predetermined position, a control unit for controlling the vibration reducing drive unit and the locking unit, and a determining unit for determining whether or not the holding unit should be locked in the predetermined position. The determining unit outputs a first predetermined signal to the control unit so as to lock the holding unit in the predetermined position at least once before operating the vibration reducing drive unit after switching ON an electricity supply. The control unit, upon receiving the first predetermined signal from the determining unit, controls the lock unit to lock the holding unit in the predetermined position.

6 Claims, 5 Drawing Sheets

VIBRATION REDUCING APPARATUS AND VIBRATION REDUCING CAMERA

BACKGROUND OF THE INVENTION

1. Field of the Invention

The present invention relates to a vibration reducing apparatus and a vibration reducing camera for reducing a vibration of an object image by moving the object image on a photographing surface of a photographing optical system. Furthermore, the vibration reducing apparatus of the invention is applicable to a telescope, binoculars, or a portable instrument using an optical system, in addition to a camera. These instruments also reduce vibrations by using optical systems.

2. Related Background Art

Hitherto, in a photographing apparatus such as a camera, if a photographer shakes the camera even slightly during photography (exposure) when photographing an object image, the object image on a photographing surface vibrates, with the result that the photo taken becomes a so-called blurred photo with unsharp outlines. Under such circumstances, there has been recently researched and developed a vibration reducing apparatus for preventing vibrations (hereinafter termed a "vibration reduction") of the object image on the photographing surface by moving an image vibration reducing optical system consisting of a part or a whole of a photographing optical system during the exposure.

Disclosed as the above vibration reducing apparatus in, e.g., Japanese Patent Application Laid-Open No. 3-110530 is an apparatus for reducing the vibrations by moving a vibration reducing optical system (hereinafter referred to as a "VR lens") within a plane perpendicular to the optical axis of the photographing optical system. In this apparatus, the VR lens is supported on an X-Y stage within the plane perpendicular to the optical axis and moved by use of two pieces of DC motors as a driving source. Rotations of the DC motor are reduced by a predetermined reduction gear, then converted into two rectilinear motions unparallel to each other by use of a lead screw, etc., and thereafter transferred to the X-Y stage. As a result, the VR lens is moved within the plane substantially orthogonal to the optical axis.

On the other hand, when using the X-Y stage as mentioned above, it may happen that the VR lens is not smoothly moved because of friction caused on the X-Y stage. Then, obviating such a problem and securing the smooth movement of the VR lens might entail a method, which has recently been utilized, of supporting the VR lens with resilient members within a lens barrel. More specifically, a plurality of cylindrical resilient members are disposed within the lens barrel so that the cylindrical axes are parallel to the optical axis, and the VR lens is cantilever-supported at their ends. With this arrangement, the VR lens is smoothly moved within the plane defined by the ends of the resilient members.

Further, if the rotary type motor such as the DC motor is adopted as the driving source, it is indispensable that the rotational motion be reduced by use of gears and converted into the rectilinear motions. These gears are hard to avoid an emission of noises. In this respect, the quietness when using a domestic photographing apparatus has been highly required of late. For this purpose, it is proposed that a voice coil motor (hereinafter abbreviated to a "VCM") capable of giving a rectilinear moving force directly to the VR lens through no intermediary of a mechanical mechanism, be adopted as the driving source for moving the VR lens.

Herein, the VCM is defined as a motor for generating the moving force by making use of an electromagnetic force produced by the current and the magnetic force and is characterized by generating the rectilinear moving force having a magnitude proportional to a value of the electric current charged.

In the conventional vibration reducing apparatus wherein the VR lens described above is cantilever-supported by the resilient members, however, if energizing of the VCM is stopped, and when the VCM comes into such a state as to cause no moving force, the VR lens cantilever-supported by the resilient members is allowed to oscillate. Therefore, if action of a force such as an impact is given to the vibration reducing apparatus from outside, it might be that the VR lens oscillates with a large amplitude, resulting in contact with an ambient fixed portion and damage.

Further, if the capability of the electricity supply declines enough due to some causes not to supply the VCM with sufficient electric power, the VCM is incapable of producing a sufficient moving force. Consequently, the VR lens gets free from the control of the VCM and starts the oscillating motions. As in the case described above, the VR lens might contact the ambient fixed portion.

Therefore, it is required in the conventional vibration reducing apparatus that the motions of the VR lens be completely controlled by supplying the VCM with sufficient electric power at all times. In the case of trying to always drive the VCM in this manner, however, because of consuming a great quantity of electric power even when the vibration reducing apparatus is not required to reduce the vibrations, there exists a problem in which the vibration reducing apparatus is hard to drive with a portable electricity supply such as a battery, etc..

SUMMARY OF THE INVENTION

To obviate the problems given above, according to one aspect of the present invention, a vibration reducing apparatus comprises a holding unit 22–27 for holding a vibration reducing optical system 21, a vibration reducing drive unit 10, 12x, 12y for reducing vibrations of an object image by moving the holding unit, a lock unit 14, 15 for locking the holding unit in a predetermined position, a control unit 8 for controlling the vibration reducing drive unit and the locking unit, and a determining unit 2 for determining whether or not the holding unit should be locked in the predetermined position. The determining unit determines that the holding unit should be locked in a given position during a non-operation period of the vibration reducing unit and outputs a predetermined signal to the control unit. The control unit, upon receiving the predetermined signal from the determining unit, controls the lock unit to lock the holding unit.

According to another aspect of the present invention, a vibration reducing apparatus comprises a holding unit 22–27 for holding a vibration reducing optical system 21, a vibration reducing drive unit 10, 12x, 12y for reducing vibrations of an object image by moving the holding unit, a lock unit 14, 15 for locking the holding unit in a predetermined position, a control unit 8 for controlling the vibration reducing drive unit and the locking unit, and a determining unit 2 for determining whether or not the holding unit should be locked in the predetermined position. A position in which the lock unit locks the holding unit is a position where the center of the vibration reducing optical system is coincident with the optical axis of the photographing optical system. The determining unit outputs a predetermined signal to the control unit to lock the holding unit at least once before operating the vibration reducing driving unit after switching ON the electricity supply. The control unit, upon receiving the predetermined signal from the determining unit, controls the lock unit to lock the holding unit.

According to still another aspect of the present invention, a vibration reducing apparatus comprises a holding unit 22–27 for holding a vibration reducing optical system 21, a vibration reducing drive unit 10, 12x, 12y for reducing vibrations of an object image by moving the holding unit, a lock unit 14, 15 for locking the holding unit in a predetermined position, a control unit 8 for controlling the vibration reducing drive unit and the locking unit, and a determining unit 2 for determining whether or not the holding unit should be locked in the predetermined position. The determining unit, when a voltage of the electricity supply 1 is under a predetermined value, determines that the holding unit should be locked in a given position and outputs a predetermined signal to the control unit. The control unit, upon receiving the predetermined signal from the determining unit, controls the lock unit to lock the holding unit without controlling the vibration reducing driving unit.

The vibration reducing apparatus further comprises a communication assisting unit 16 for assisting communications between the determining unit and the control unit.

According to yet another aspect of the present invention, a vibration reducing camera comprises a vibration reducing apparatus described above, and a signal generating unit S1 for generating a get-ready-for photography signal. The determining unit, when the get-ready-for photography signal is not again generated before a predetermined time elapses since the signal generating unit ceased to generate the signal, determines that the holding unit should be locked in the given position and outputs a predetermined signal to the control unit. The control unit, upon receiving the predetermined signal from the determining unit, performs no control of the vibration reducing drive unit or ceases the control thereof and thus controls the lock unit to lock the holding unit.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments will hereinafter be described in greater detail.

Figure 1:
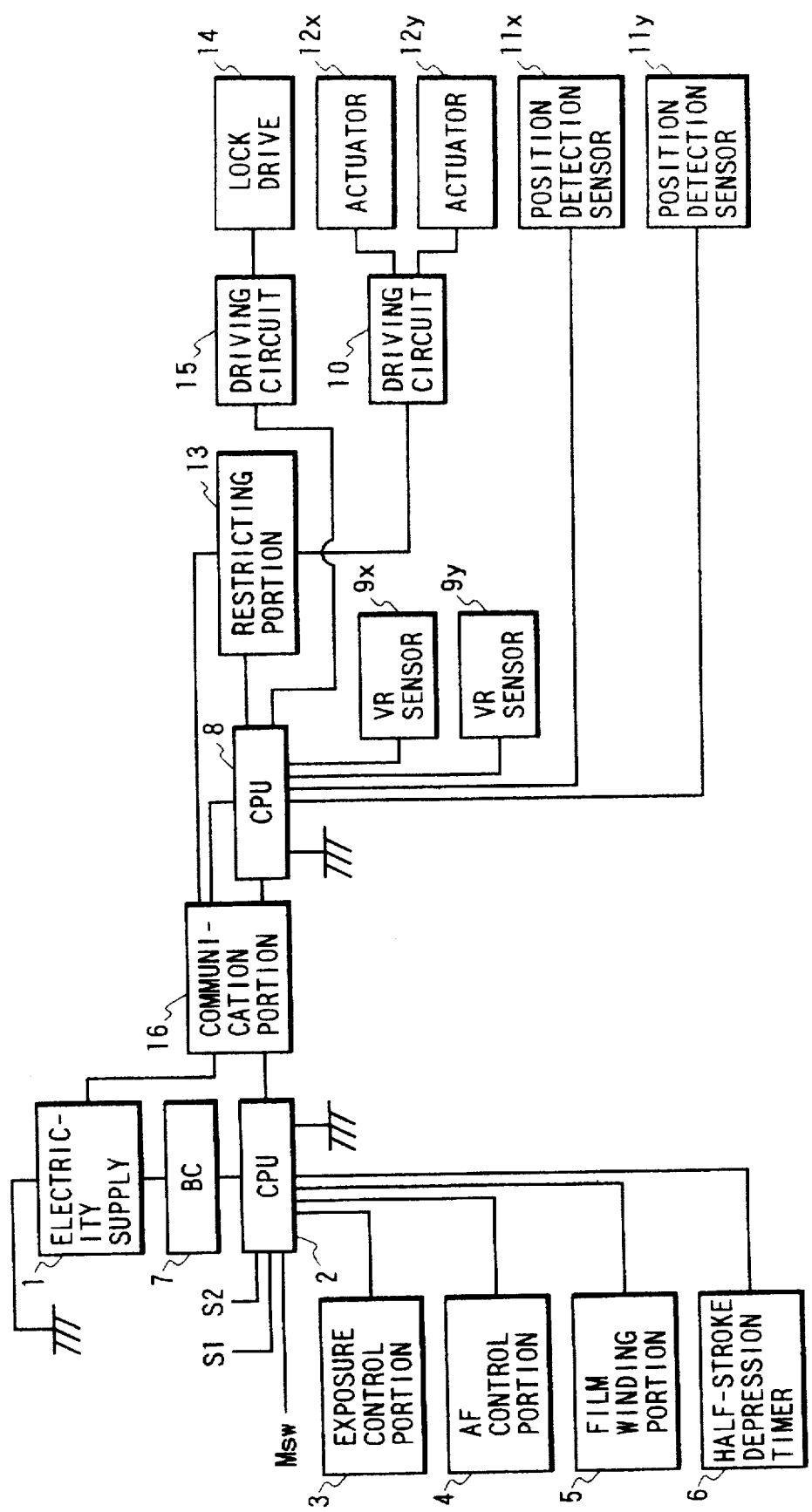
FIG. 1 is a block diagram illustrating an embodiment of the present invention.

FIG. 1 is a block diagram showing an embodiment of a vibration reducing camera according to the present invention.

An electricity supply 1, upon turning ON a main switch Msw, supplies an apparatus in this embodiment with electric power.

A switch S1 is turned ON by half-stroke-depressing a release button, while a switch S2 is turned ON by fully depressing the release button. In accordance with the embodiment, when the switch S1 is turned ON, there are executed photographic preparations such as adjusting a shutter speed and a focal length. Further, when the switch S2 is turned ON, a release operation is performed, thus starting an exposure.

A CPU 2 is an electronic circuit for controlling an exposure control portion 3, an AF control portion 4, a film winding portion 5 and a half-stroke depression timer 6 on the basis of results of detections by an unillustrated AE sensor and AF sensor. Herein, the exposure control portion 3 controls an unillustrated stop mechanism and shutter mechanism on the basis of the result of the detection by the AE sensor, thus controlling an exposure quantity when performing the photography. The AF control portion 4 controls a focusing operation of an optical system (not shown) on the basis of an output of the AF sensor. Further, the winding portion 5 winds up a film after finishing the photography. The half-stroke depression timer 6 is a timer operated under a predetermined condition. The operating condition for the half-stroke depression timer 6 will be explained with reference to FIGS. 5A to 5D.

A BC 7 is a battery check circuit for measuring a voltage of the electricity supply 1 incorporated in accordance with this embodiment. The BC 7 always checks the battery and continues to, if a power voltage is smaller than a voltage value (hereinafter termed a "BC voltage") needed at the minimum for normally reducing the vibrations in this embodiment, output to the CPU 2 a signal (hereinafter referred to as a "BC voltage signal") purporting that the voltage decreases. On the other hand, the CPU 2 monitors whether or not the BC always output the BC voltage signal and, upon receiving the BC voltage signal, determines that the VR lens 21 be locked in a given position. As a result, the CPU 2 immediately outputs to a CPU 8 a signal (hereinafter termed a "lock signal") indicating that the VR lens 21 (FIG. 2) should be immediately locked in the given position. Further, the CPU 2 indicates the purport of the voltage being decreased on an unillustrated indicating portion (hereinafter referred to as a "BC indication") and thus notifies the photographer of necessities for replacing and charging the battery.

The CPU 8 is an electronic circuit for controlling VR sensors 9x, 9y and a driving circuit 10, or detecting and processing outputs thereof.

The VR sensors 9x, 9y are sensors for detecting vibrations of the camera. The CPU 8 detects attitudes (position, speed, acceleration, angle, angular speed and angular acceleration) of the camera at that moment on the basis of the outputs of the VR sensors 9x, 9y.

The position detection sensors 11x, 11y are sensors for detecting a position of the lens frame 23 (FIG. 2) which will be mentioned later.

Actuators 12x, 12y drive the lens frame 23 within a plane substantially perpendicular to the optical axis. Particulars of the actuators 12x, 12y will be explained with reference to FIG. 2.

The driving circuit 10 is a circuit for driving the actuators 12x, 12y upon receiving a transmission of a control signal relative to the reduction of vibrations from the CPU 8 via the control portion 13.

Further, the control portion 13 is a circuit for detecting the current supplied to the driving circuit 10 from the electricity supply 1 and restricting a value of the detected current so that a total value of the currents supplied to the actuators 12x, 12y does not exceed a predetermined value.

A lock drive 14 is a locking unit for mechanically locking the VR lens. Details of a construction of the lock drive 14 will be explained later. Further, the drive circuit 15 is a circuit for driving the lock drive 14, corresponding to an output signal from the CPU 8.

A communication portion 16 is an electronic circuit for helping the communications between two CPUs by, when the CPU 2 and CPU 8 transfer and receive the data, controlling timings of signals thereof. For instance, when the CPU 2 receives the BC voltage signal from the BC 7, the CPU 2 immediately outputs a corresponding signal to the communication portion 16. The communication portion 16 confirms that the CPU 8 is in such a status as to be capable of receiving the signal from outside and thereafter outputs to the CPU 8 the signal transmitted from the CPU 2. Thus, in accordance with this embodiment, since the communication portion 16 is provided, even if the CPU 8 falls into a temporary incapability of communicating with the CPU 2, the output signal of the CPU 2 can be thereafter surely transmitted to the CPU 8.

Figure 3:
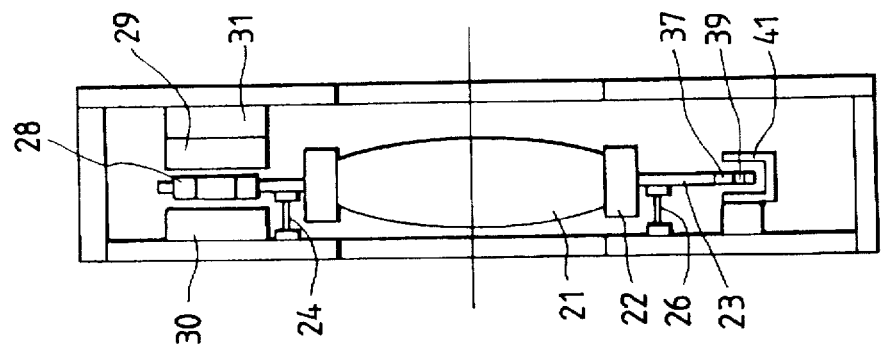
FIG. 3 is a sectional view taken along the line III—III of the mechanism for moving the VR lens shown in FIG. 2.
Figure 2:
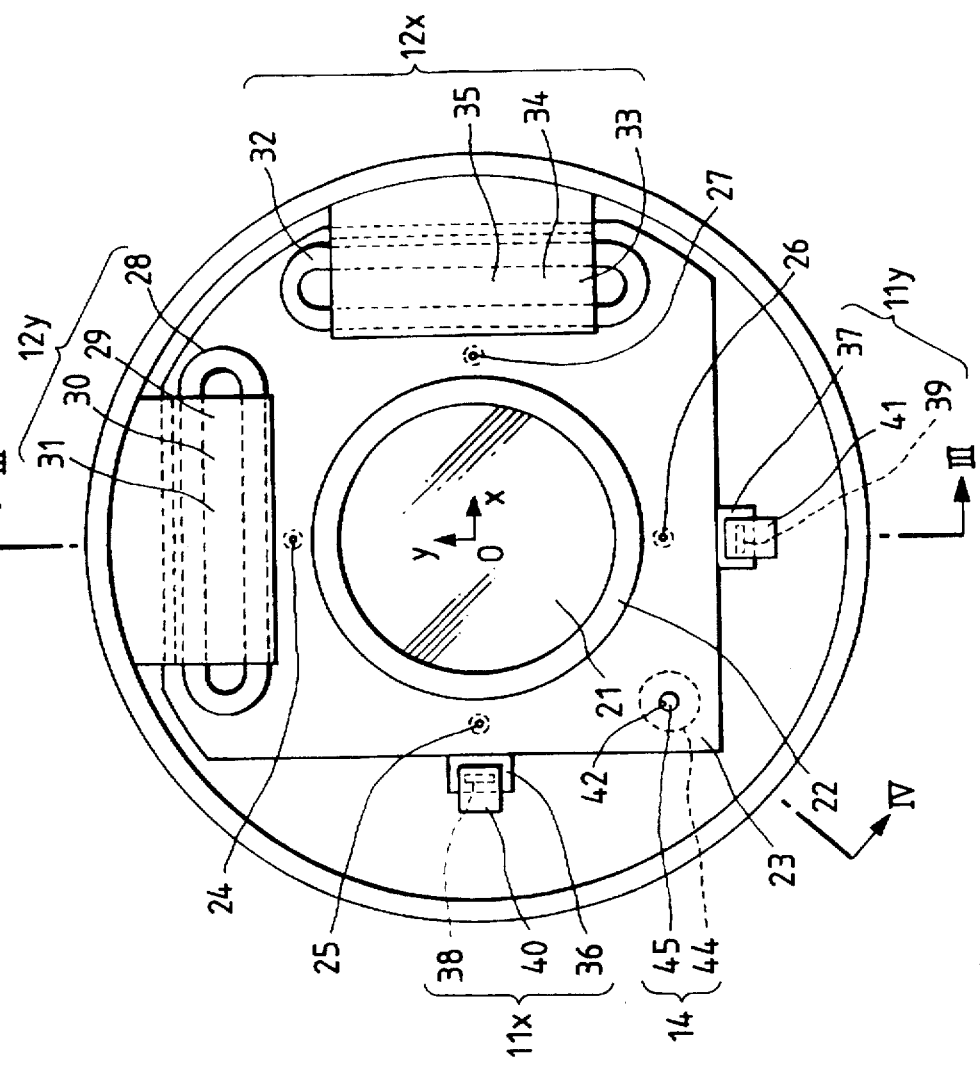
FIG. 2 is a front view showing a mechanism for moving a VR lens in the embodiment of the present invention.

FIGS. 2 and 3 are diagrams of assistance in explaining a mechanism for moving the VR lens in this embodiment. FIG. 2 is a front view illustrating the mechanism including the VR lens. FIG. 3 is a sectional view taken substantially along the line III—III of FIG. 2.

A circular member depicted substantially at the center in FIG. 2 is a VR lens 21 in this embodiment. The VR lens 21 is held in a lens chamber 22 on its outer periphery, and further the lens chamber 22 is held by a lens frame 23 on an outer periphery.

Resilient members 24–27 are metallic wires for supporting the lens frame 23 within the lens barrel. The resilient members 24–27 are placed in parallel to the optical axis, and respective lengths thereof are substantially the same. Accordingly, the lens frame 23 supported by these resilient members is movable in an arbitrary direction within the plane substantially perpendicular to the optical axis, and, as a result of the movement, the lens frame 23 is never inclined to the surface thereof.

A coil 28, a magnet 29, yokes 30 and 31 (or a coil 32, a magnet 33, and yokes 34 and 35) are combined to constitute an actuator 12y (or 12x) shown in FIG. 1, a so-called voice coil motor (hereinafter abbreviated to "VCM").

Coils 28, 32 are coil members composed of thin and elongate conductive wires and take configuration similar to a track for an athletic competition, which configuration is defined by two rectilinear portions parallel to each other and two semicircular portions connecting the ends of these rectilinear portions, respectively. The coils 28, 32 are attached to an outer edge of the lens frame 23 so that vertical bisectors of those rectilinear portions intersect each other substantially at right-angles substantially at the center of the VR lens 21.

The yokes 30, 31 and the magnet 29 are members for forming a magnetic field acting across the coil 28 in the optical-axis direction. The yokes 30 and 31 are disposed so that the magnet 29 is interposed therebetween in the optical-axis direction. Further, the yoke 30 and the magnet 29 are disposed so that the coil 28 is interposed therebetween in the optical-axis direction. Similarly, the yokes 34, 35 and the magnet 33 are members for forming a magnetic field acting across the coil 32. The yokes 34 and 35 are disposed so that the magnet 33 is interposed therebetween in the optical-axis direction, and the yoke 34 and the magnet 33 are disposed so that the coil 32 is interposed therebetween in the optical-axis direction.

On the other hand, the coils 28, 32 are connected to the above drive circuit 10 and supplied with the current from the electricity source 1 via the drive circuit 10. When the current flows across the coil 28 (32), an electromagnetic force (hereinafter termed a "thrusting force") between the current and a magnetic field generated by the magnet 29 (33). This thrusting force diverts depending on a direction of the current flowing across the coil 28 (32), and increases and decreases its magnitude in proportion to a magnitude of the current.

A lens position detecting portion 36 (37) is a protrusion located on a line of extension of the horizontal bisector (x-axis) vertical bisector (y-axis) of the coil 28 (28) of the rectilinear portion of the coil 32 on the side surface of the lens frame 23, and is formed with a slit 38 (39) which can transmit the light beams traveling substantially in the optical-axis direction, at its central portion.

A photo interrupter 40 (41) is a member constructed mainly of a light projecting element and the light receiving portion, and the lens position detecting portion 36 (37) is so disposed as to be interposed between the light projecting element and the light receiving element (see FIG. 3). With this arrangement, the photo interrupter 40 (41) is irradiated with light beams from the light projecting element. Then, the light receiving element detects the light beams penetrating the slit 38 (39), whereby a movement quantity of the lens frame 23 in the x-axis direction (y-axis direction) can be detected. The position detection sensor 11x (11y) shown in FIG. 1 is constructed of the lens position detecting portion 36 (37) and the photo interrupter 40 (41). Data about the movement quantity of the lens frame 23 that is detected by the photo interrupter 40 (41) is fed back to the CPU 8, and the CPU 8 outputs a new control signal for controlling the actuator 12x (12y) to the drive circuit 10 on the basis of the above data. In accordance with this embodiment, such an operation is repeated, thus disposing the VR lens 21 in a predetermined position and reducing the vibrations.

Next, an operation of the mechanism for moving the VR lens 21 will be explained.

As explained above, the driving circuit 10 receiving the transmission of the control signal from the CPU 8 supplies the coils 28, 32 with proper amounts of currents to drive the actuators 12x, 12y. The VR lens 21 is thereby moved by the electromagnetic force (thrusting force) generated by mutual action between the currents flowing across the coils 28, 32 and the magnetic fields generated from the magnets 29, 33. When the VR lens 21 is moved by this thrusting force from the center of the optical-axis, the resilient members 24–27 supporting the lens frame 23 become resilient enough to generate a spring force acting toward the optical axis. As a result, the VR lens 21 moves up to such a position that the thrusting force generated by the coils 28, 32 equals the spring force generated by the resilient members 24–27.

Herein, as a matter of fact, a mass of the whole mechanism for moving the VR lens 21 makes a gravity-directional force act upon the resilient members 24–27. In addition, when controlling the movement of the VR lens 21, a variety of forces are generated, and hence it follows that the VR lens 21 moves to such a position that the thrusting force equals with these forces. Furthermore, back electromotive forces are generated in the coils 28, 32 due to the movement of the VR lens 21, and therefore the thrusting force generated by the VCM decreases, with the result that the VR lens 21 moves to a position of equilibrium between the decreased thrusting force and the spring force.

Figure 4:
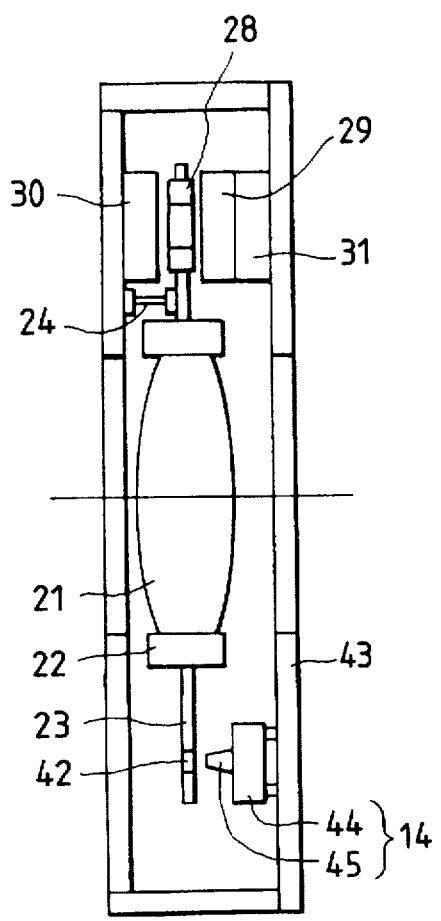
FIG. 4 is a sectional view taken substantially along the line IV—O—IV, showing the mechanism for moving the VR lens shown in FIG. 2.

Next, the lock device 14 will be explained with reference to FIGS. 2 and 4. FIG. 4 is a sectional view taken substantially along the line IV—O—IV of FIG. 2.

The lens frame 23 is formed with a hole 42 penetrating the lens frame 23 in its outer edge in the optical-axis direction. On the other hand, a lock member 43 adjacent to the lens frame 23 in the optical-axis direction includes a solenoid 44 and a shaft 45 that are substantially coaxial with the central axis of the hole 42. Herein, the shaft 45 and the solenoid 44 correspond to the lock device 14 shown in FIG. 1.

The shaft 45 is held by the solenoid 44 so that the shaft 45 is movable back and forth in the optical-axis direction and, upon supplying the solenoid 44 with the current, moves to and fro in the optical-axis direction. Herein, the shaft 45 is a bar-like member with its tip machined in a tapered shape on the side of the hole 42, and a diameter of the proximal portion thereof is larger than a diameter of the hole 42 on the side of the lens frame. Accordingly, when the shaft 45 is driven in the optical-axis direction and toward the lens frame 23, the tapered tip of the shaft 45 is fitted into the hole 42 of the lens frame 23 and stops halfway up the tapered portion. The lens frame 23 is thereby inhibited by the shaft 45 from moving in a direction orthogonal to the optical axis, thus fixing its position.

Note that the hole 42 and the shaft 45 are disposed so that the VR lens 21 is coaxial with the optical axis of the photographing optical system as a result of fixing the lens frame 23 by the shaft 45 in this embodiment.

Next, the operation of this embodiment will be explained with reference to FIGS. 5A, 5B, 5C and 5D. FIGS. 5A to 5D are flowcharts showing the operation in this embodiment.

Figure 5A:
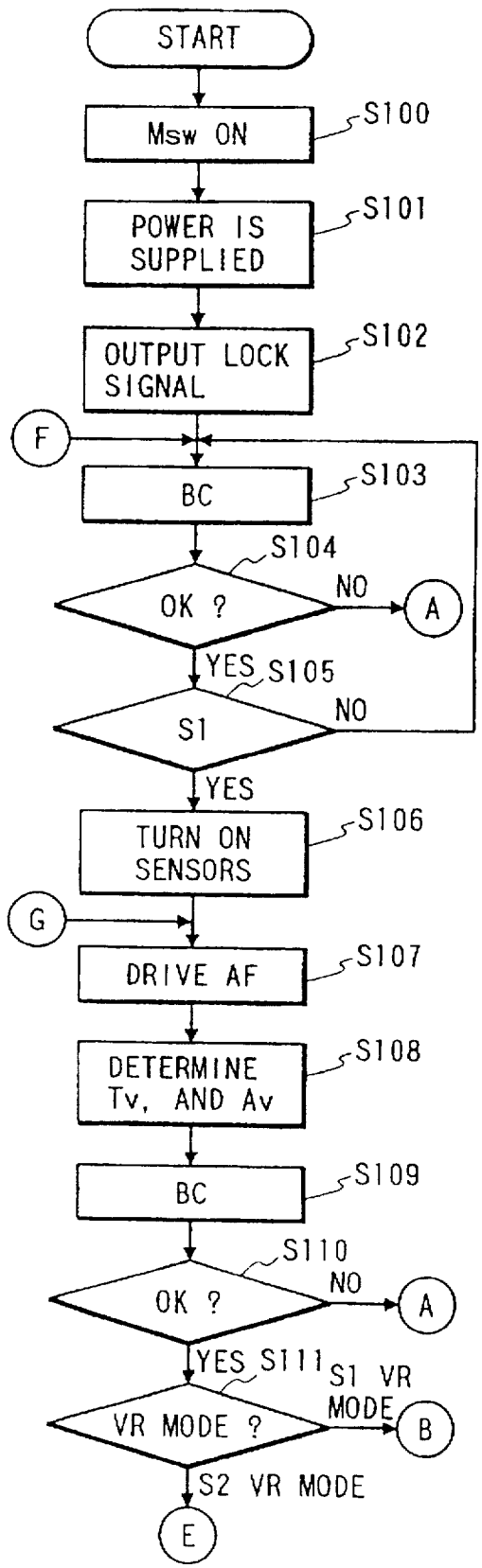
FIGS. 5A, 5B, 5C and 5D are flowcharts showing operations in the embodiment of the present invention.

Referring to FIG. 5A, when the main switch Msw is turned ON (S100), the CPU 2 is turned on and the CPU 8 is turned on through the communication portion 16 (S101). When the CPU 2 is turned on, the CPU 2 immediately outputs a signal (hereinafter referred to as a "lock signal") to make CPU 8 lock the VR lens 21 in a given position via the communication portion 16 (S102). The CPU 8, upon receiving the lock signal, issues a VR lens lock command to the driving circuit 15, and the driving circuit 15 supplies the solenoid coil 44 with the current. As a result, the shaft 45 is inserted into the hole 42 of the lens frame 23, whereby the lens frame 23 and the VR lens 21 are locked in their positions. With this operation, in this embodiment, even when the VR lens 21 moves to an off-position deviating from the optical axis during an off-state of the switch Msw, the center thereof can be easily coincident with the optical axis of the photographing optical system without using the position detection sensors 11x, 11y and the VCMs 12x, 12y.

Figure 5B:
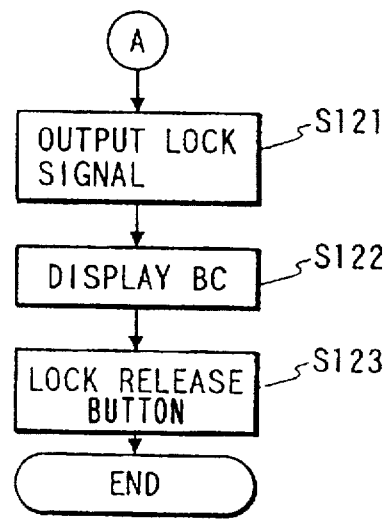

Next, the BC 7 checks a voltage of the electricity supply, i.e., confirms the voltage of the electricity supply 1 (S103). If the voltage of the electricity supply is under a BC voltage, the BC 7 outputs a BC voltage signal to the CPU 2 (S104: No). As a result, the CPU 2 determines that the VR lens 21 should be locked in the given position and therefore, as shown in FIG. 5B, emits a lock signal (S121). The CPU 8 receiving the lock signal via the communication portion 16 locks the VR lens 21 in the given position by controlling the lock device 14 and the driving circuit 15 as well. Further, the CPU 2 displays a BC indication on an unillustrated display portion (S122). The CPU 2 then notifies the photographer of the battery being consumed up and therefore prompts the photographer to replace the battery and to charge. Next, the release button is locked (S123), thus finishing the photographing operation. As explained above, in accordance with this embodiment, the lock device 14 mechanically locks the VR lens 21 when the electricity supply voltage decreases on one hand, and the vibrations are not reduced on the other hand. That is, in this embodiment, the electric power is restrained from being consumed in quantity by performing no unstable vibration reduction due to the decrease in terms of voltage of the electricity supply. Then, the VR lens 21 uncontrollable in its motion by the VCMs 12x, 12y is prevented from being brought into contact with and thereby damaged by the ambient fixed member due to an unexpected motion. Further, in accordance with this embodiment, as described above, whether or not the VR lens 21 should be locked in the given position is determined, and the CPU 2 transmitting the lock signal is set separate from the CPU 8 for actually controlling the lock device 14. With this separation, in this embodiment, the load upon the CPU 8 controlling the vibration reduction and other operations is relieved, and the CPU 2 is capable of always properly determining when the VR lens 21 should be locked.

On the other hand, referring to FIG. 5A, when the electricity supply voltage is over the BC voltage (S104: Yes) and the switch S1 is turned ON with a half-stroke depression of the release button (S105: Yes), each of the sensors (VR-, AF- and AE-sensors) is switched ON (S106). The VR sensors 9x, 9y that have been switched ON output a result of the detection about the vibrations to the CPU 8. The CPU 8 obtains data (e.g., an angular velocity) about the attitudes of the whole camera on the basis of the output signal thereof, and calculates an output pertaining to the attitude as a fiducial value (e.g., the angular velocity=0). Further, a vibration quantity on the photographing surface is calculated based on that value.

Next, the CPU 2 outputs a signal to the AF control portion 4 in accordance with the output of the AF sensor, and the AF control portion 4 makes an object image focus upon the photographing surface by moving a focusing lens (S107). Moreover, Tv value and Av value are determined based on the output of the AE sensor and displayed on the display portion (not shown) of the camera (S108).

Next, the BC 7 checks once again the electricity supply voltage (S109). As a result, if the electricity supply voltage is under the BC voltage, the BC 7 outputs the BC voltage signal, and further the CPU 8 transmits the lock signal (S110: No). Then, the respective processes after step S121 shown in FIG. 5B are to be executed. Whereas if the electricity supply voltage is determined to be over the BC voltage (S110: Yes), an unillustrated setting portion is enquired about whether the VR mode is a mode effected during only the exposure (hereinafter termed an "S2VR mode") or a mode started upon the half-stroke depression (on-state of the switch S1) of the release button for a time excluding the exposure (hereinafter termed an "S1VR mode") (S111).

Figure 5C:
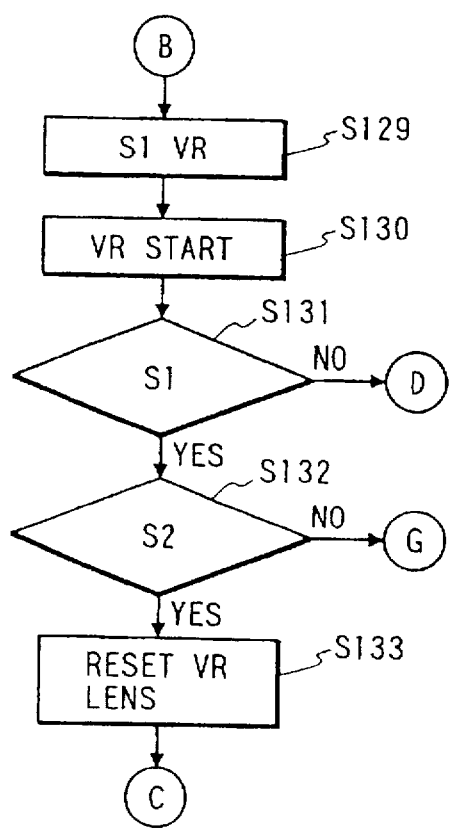

When the VR mode is the S1VR mode (S129), the release button is depressed at the half-stroke, and, when the switch S1 is turned ON, the vibration reduction is immediately started as shown in FIG. 5C (S130). That is, the CPU 8 controls the driving circuit 10 and the actuators 12x, 12y based on the outputs of the position detection sensors 11x, 11y, and moves the VR lens 21 so that the vibrations of the object image on the photographing surface are reduced. Thereafter, the vibrations are continuously reduced during the on-state of the switch S1 (S131: Yes), and, when the switch S2 is turned ON with the full-stroke depression of the release button (S132: Yes), the VR lens 21 is centered (S133).

Herein, the centering implies locating the center of the VR lens 21 in a predetermined initial position so as to take a maximum movement range of the VR lens 21. In this embodiment, the VR lens 21 is located so that the center thereof is coaxial with the optical axis of the photographing optical system.

Figure 5D:
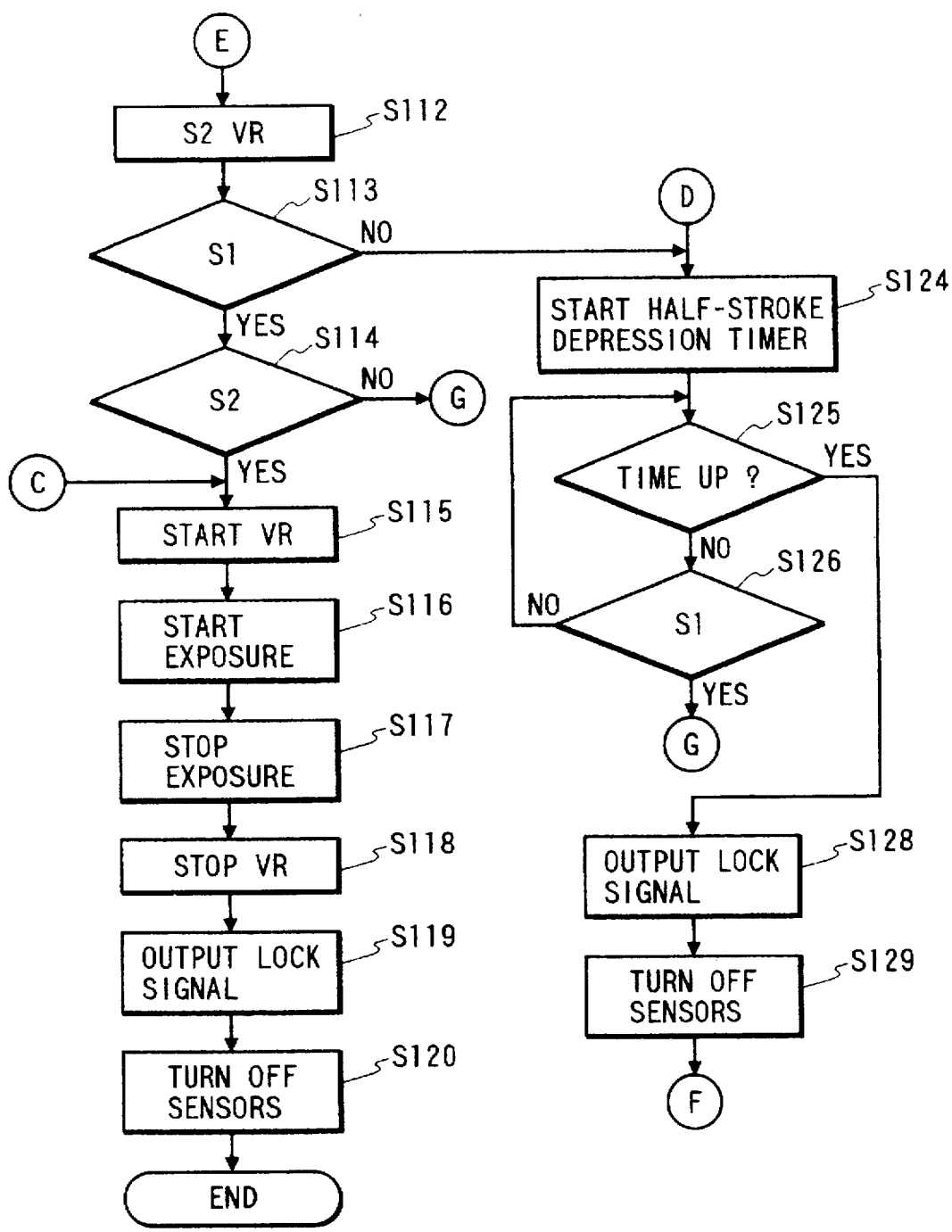

After finishing the centering, the operation in this embodiment proceeds to step S115 shown in FIG. 5D. Further, when the switch S1 is turned OFF before the switch S2 is turned ON (S131: No), the operation in this embodiment proceeds to step S124 shown in FIG. 5D.

In step S111 shown in FIG. 5A, if in the S2VR mode (S112), after confirming that the switches S1 and S2 are in the on-state as shown in FIG. 5D (S113: Yes, S114: Yes), the vibration reduction is started (S115). Further, the quick return mirror, the stop and the shutter are driven based on the Tv- and Av-values previously calculated, thus performing the exposure operation (S116). After a predetermined time has elapsed, the exposure operation is finished (S117), and subsequently the VR movement also comes to an end (S118). Next, the CPU 2 outputs the lock signal, and the CPU 8 controls the driving circuit 15 and the lock device 14, thus locking the VR lens in the given position. With this operation, in accordance with this embodiment, even in such a state that the VCMs 12x, 12y are not hereafter driven, the VR lens 21 never produce the unexpected motion. Further, the respective sensors stop being supplied with the electricity from the electricity supply (S120), and a series of photographing operations are ended.

On the other hand, in above step S113, the photographer cancels the half-stroke depression of the release button, and the switch S1 is turned OFF (S113: No). In this case, when the half-stroke depression timer 6 confirms the elapse of the set time (S125: Yes), the CPU 2 outputs the lock signal, thereby locking the VR lens 21 (S128). Further, the supply to the respective sensors from the electricity supply is stopped (S129). The operation in this embodiment proceeds to step S103 in FIG. 5A.

That is, in accordance with this embodiment, the switch S1, for transmitting a signal purporting that a preparation for photography should be made, changes from the on-state to the off-state, and a fixed time has elapsed. In this case, it shall be presumed that the photographer does not make the preparation for photography, and the lock device 14 locks the VR lens 21 in the given position so as not to cause the unexpected motion of the VR lens 21.

In step S125 shown in FIG. 5D, the switch S1 is again turned ON (step S126: Yes) before the set time (S125: No), the operation in this embodiment proceeds to step S107 in FIG. 5A. Thereafter, if the half-stroke depression of the release button continues (S113: Yes), or if depressed at the half-stroke within the set time of the half-stroke depression 6, as shown in FIG. 5D, the vibration reduction is started as shown in FIG. 5D (S115). Then, the exposure is executed according to the above-mentioned operation, and the photographing operation is thus ended.

As discussed above, in accordance with this embodiment, if the voltage of the electricity supply decreases under a value needed for normally reducing the vibrations, or if it is determined that the photographer does not make the preparation for photography, the VR lens 21 is locked in the given position by the lock device 14 without driving the VCM. With this operation, in accordance with this embodiment, the VR lens 21 is prevented from coming into contact with and being damaged by an ambient fixed member due to an accidental motion. And this embodiment makes it possible to reduce an electric power consumed for locking the VR lens 21.

Also, in this embodiment, the lock device 14 fixes the VR lens 21 in a position where a center of the VR lens 21 is aligned with an optical axis of the photographing optical system. Therefore, in this embodiment, as the VR lens 21 is once fixed in the position by the lock device 14 before an exposure and after the electricity supply 1 is turned ON, the VR lens 21 can be easily placed in an initial position without using the VCMs 12x, 12y and the position detection sensors 11x, 11y.

Furthermore, in this embodiment, the VR lens 21 is fixed in the position by the lock device 14 even after the end of photographing. With this operation, in accordance with this embodiment, after the driving of the VCMs 12x, 12y has been stopped, or after the electricity supply 1 has been released, the VR lens 21 is prevented from making the unexpected motion.

(Other Embodiments)

Note that the present invention is not limited to the embodiment discussed above. The embodiment given above is an example, and embodiments having substantially the same construction as the technical concept stated in the appended claims of the present invention and also the same operational effect, are all included in the technical scope of the present invention.

For example, in the embodiment discussed above, the lock device 14 involves the use of the shaft 45 with its tip portion machined in the tapered shape but may involve the use of hole 42 machined in the tapered shape or both of the shaft 45 and the hole 42 that are machined in the tapered shape.

Furthermore, a mode of the lock device 14 is not confined to that exemplified in the embodiment discussed above. If capable of surely stably locking the VR lens 21 in the predetermined position, other devices may also be available. For instance, there may be a device having a mechanism for holding the lens frame 23 from radial directions with the optical axis being centered.

As explained above in greater detail, according to the embodiment of the present invention, the determining portion (CPU 2) determines whether or not the movement of the holding portion should be fixed, while the control portion (CPU 8) controls the locking portion. It is therefore feasible to provide the vibration reducing apparatus or making the proper determination irrespective of the working state of the control portion. Further, the holding portion 23 is locked by the locking portion 14 during the non-operation period of the vibration reducing drive portions 12x, 12y. Hence, it is feasible to provide the vibration reducing apparatus in which the vibration reducing optical system 21 is not brought into contact with the ambient members enough to cause the damage thereto due to the unexpected motion thereof.

According to another embodiment of the present invention, the locking portion locks the holding portion at least once before working the vibration reducing drive portion after switching ON the electricity supply. Therefore it is possible to provide the vibration reducing apparatus capable of exhibiting such an effect that the vibration reducing optical system can be easily disposed in the predetermined position before driving the vibration reducing drive portion.

According to still another embodiment of the present invention, if the voltage of the electricity supply is under the predetermined value, the locking portion locks the holding portion without controlling the vibration reducing drive portion. Hence, it is feasible to provide the vibration reducing apparatus capable of exhibiting such effects that the vibration reducing drive portion is not operated in the unstable state and of restraining the quantity of the electric power consumption.

According to yet another embodiment of the present invention, the predetermined signal outputted when the determining portion determines that the holding portion should be locked in the given position, is certainly transmitted to the control portion.

According to a further embodiment of the present invention, if the signal generating portion does not generate the signal once again before the predetermined time elapses since the signal generating portion ceased to generate the signal, the locking portion locks the holding portion by executing no control of the vibration reducing drive portion or by ceasing the control thereof. It is therefore possible to provide the vibration reducing camera exhibiting such effects that the vibration reducing optical system is never brought into the ambient members enough to cause the damage thereto due to the unexpected motion.

What is claimed is:

1. A vibration reducing apparatus comprising:

a holding unit to hold a vibration reducing optical system;

a vibration reducing drive unit to reduce vibrations of an object image by moving said holding unit;

a lock unit to lock said holding unit in a predetermined position;

a control unit to control said vibration reducing drive unit and said locking unit; and a determining unit to determine whether said holding unit should be locked in the predetermined position, wherein said determining unit outputs a lock signal to said control unit in response to an electricity supply to said vibration reducing apparatus so as to lock said holding unit in the predetermined position at least once before operating said vibration reducing drive unit, and said control unit, upon receiving the lock signal from the determining unit, controls said lock unit to lock said holding unit in the predetermined position.

2. A vibration reducing apparatus according to claim 1, further comprising:

a communication assisting unit to assist communications between said determining unit and said control unit.

3. A vibration reducing apparatus according to claim 1, further comprising a photographing optical system, wherein a center of said vibration reducing optical system is coincident with an optical axis of said photographing optical system when said holding unit is in the predetermined position.

4. A vibration reducing camera comprising:

a vibration reducing apparatus comprising:

a holding unit to hold a vibration reducing optical system:

a vibration reducing drive unit to reduce vibrations of an object image by moving said holding unit:

a lock unit to lock said holding unit in a predetermined position:

a control unit to control said vibration reducing drive unit and said locking unit; and a determining unit to determine whether said holding unit should be locked in the predetermined position, wherein said determining unit outputs a lock signal to said control unit in response to an electricity supply to said vibration reducing apparatus so as to lock said holding unit in the predetermined position at least once before operating said vibration reducing drive unit, and said control unit, upon receiving the lock signal from the determining unit, controls said lock unit to lock said holding unit in the predetermined position;

a signal generating unit to generate a get-ready-for photography signal; and a timer to count a predetermined time, wherein said determining unit causes the timer to start counting the predetermined time when the get-ready-for photography signal disappears, and said determining unit outputs the lock signal to said control unit when the get-ready-for photography signal is not again generated before the predetermined time elapses.

5. A vibration reducing apparatus according to claim 1, wherein said vibration reducing drive unit reduces vibrations of an object image on a photographing surface.

6. A vibration reducing apparatus comprising:

a holding unit to hold a vibration reducing optical system;

a locking unit to lock said holding unit;

a control unit to control said locking unit; and a determining unit to output a lock signal to said control unit in response to an electricity supply to said vibration reducing apparatus so that said control unit controls said locking unit to lock said holding unit at least once before operating the vibration reducing optical system.

* * * * *

UNITED STATES PATENT AND TRADEMARK OFFICE
CERTIFICATE OF CORRECTION

PATENT NO.:      5,748,995
DATED      :     May 5, 1998
INVENTOR(S):    Yoshihisa Kitagawa, et al.

It is certified that error appears in the above-identified patent and that said Letters Patent is hereby corrected as shown below:

Title Page,   [54] change Title to
  --VIBRATION REDUCING APPARATUS AND CAMERA USING SAME TO REDUCE VIBRATION OF AN OBJECT IMAGE BY MOVING THE OBJECT IMAGE ON A PHOTOGRAPHING SURFACE--.

Column 12,  lines, 2, 3, 5, and 7 (claim 4), change ":" to --;--;
  line 11 (claim 4), change "." to --,--.

Signed and Sealed this

First Day of August, 2000

Attest:

Q. TODD DICKINSON

*Attesting Officer*          *Director of Patents and Trademarks*